(12) United States Patent
Mody et al.

(10) Patent No.: US 11,550,604 B2
(45) Date of Patent: Jan. 10, 2023

(54) DYNAMIC CLIENT-SIDE UPDATE OF A VIEW OF AN APPLICATION

(71) Applicant: ServiceNow, Inc., Santa Clara, CA (US)

(72) Inventors: Yamit P. Mody, San Diego, CA (US); Gustavo Garcia, San Diego, CA (US); Sean Andrew Bradley Bowrin, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/141,829

(22) Filed: Jan. 5, 2021

(65) Prior Publication Data
US 2022/0214896 A1 Jul. 7, 2022

(51) Int. Cl.
| | |
|---|---|
| *G06F 9/451* | (2018.01) |
| *G06F 3/0481* | (2022.01) |
| *H04L 67/08* | (2022.01) |
| *G06F 3/0484* | (2022.01) |
| *H04L 67/01* | (2022.01) |

(52) U.S. Cl.
CPC ............ *G06F 9/452* (2018.02); *G06F 3/0481* (2013.01); *G06F 3/0484* (2013.01); *H04L 67/01* (2022.05); *H04L 67/08* (2013.01)

(58) Field of Classification Search
CPC ...... G06F 9/452; G06F 3/0481; G06F 3/0484; H04L 67/08; H04L 67/42
See application file for complete search history.

(56) References Cited

U.S. PATENT DOCUMENTS

| | | | | |
|---|---|---|---|---|
| 7,885,981 | B2 * | 2/2011 | Kaufman | G06F 16/2423 707/802 |
| 10,019,242 | B2 * | 7/2018 | Rogers | G06F 8/38 |
| 2004/0148375 | A1 * | 7/2004 | Levett | G06F 9/46 707/999.001 |
| 2005/0050301 | A1 * | 3/2005 | Whittle | G06F 9/451 707/999.1 |
| 2007/0127426 | A1 * | 6/2007 | Watters | H04L 67/125 370/465 |
| 2009/0319636 | A1 * | 12/2009 | Tokumi | H04L 67/53 709/218 |
| 2011/0071869 | A1 * | 3/2011 | O'Brien | G06Q 10/103 705/7.12 |
| 2012/0036552 | A1 * | 2/2012 | Dare | H04L 41/0803 726/1 |
| 2013/0262626 | A1 * | 10/2013 | Bozek | H04L 67/42 709/217 |

(Continued)

*Primary Examiner* — Tadesse Hailu
(74) *Attorney, Agent, or Firm* — Van Pelt, Yi & James LLP

(57) ABSTRACT

A specification of a client-side user interface behavior for a view of a computer application is received from a representative of an organization. The received specification is stored. A request for content of the view is received via a network from the computer application associated with a user that belongs to the organization. The received specification is identified as being associated with the requested content of the view. The requested content of the view and an identifier of the identified specification of the client-side user interface behavior are provided via the network. The computer application utilizes the received identifier of the identified specification of the client-side user interface behavior to modify the view of the computer application.

20 Claims, 11 Drawing Sheets

(56) References Cited

U.S. PATENT DOCUMENTS

| | | | |
|---|---|---|---|
| 2014/0026113 A1* | 1/2014 | Farooqi | G06F 8/36 |
| | | | 717/107 |
| 2014/0164944 A1* | 6/2014 | Sivakumar | G06F 16/9577 |
| | | | 715/746 |
| 2015/0040099 A1* | 2/2015 | Mall | H04L 41/082 |
| | | | 717/121 |
| 2016/0328522 A1* | 11/2016 | Howley | G06Q 40/08 |
| 2017/0126692 A1* | 5/2017 | Stuntebeck | H04W 12/37 |
| 2020/0097613 A1* | 3/2020 | Shah | H04L 67/01 |
| 2020/0169620 A1* | 5/2020 | Vlachogiannis | H04L 67/34 |
| 2021/0081464 A1* | 3/2021 | Buehler | G06F 16/9577 |
| 2021/0173627 A1* | 6/2021 | Ranjan | H04L 65/4084 |
| 2021/0357939 A1* | 11/2021 | Davis | G06F 11/3664 |

* cited by examiner

DYNAMIC CLIENT-SIDE UPDATE OF A VIEW OF AN APPLICATION

BACKGROUND OF THE INVENTION

Cloud-based services allow customers to store, access, and manage small to large volumes of customer data that can be accessed remotely from a variety of clients. The stored customer data can be a diverse assortment of content data including information on incident reports, hardware and software assets, and employee timesheets, among others. The content data can be hosted and viewed by clients of the cloud-based service using a custom computer application, such as a mobile application. The combination of a client application and a cloud-based service allows customers to interact with the customer data, for example, by viewing and modifying the data. The cloud-based nature of the combination allows the customer data to be accessed with a high level of operational performance but with limited management requirements required from the customer and the ability to scale as demand changes.

BRIEF DESCRIPTION OF THE DRAWINGS

Various embodiments of the invention are disclosed in the following detailed description and the accompanying drawings.

DETAILED DESCRIPTION

Figure 1:
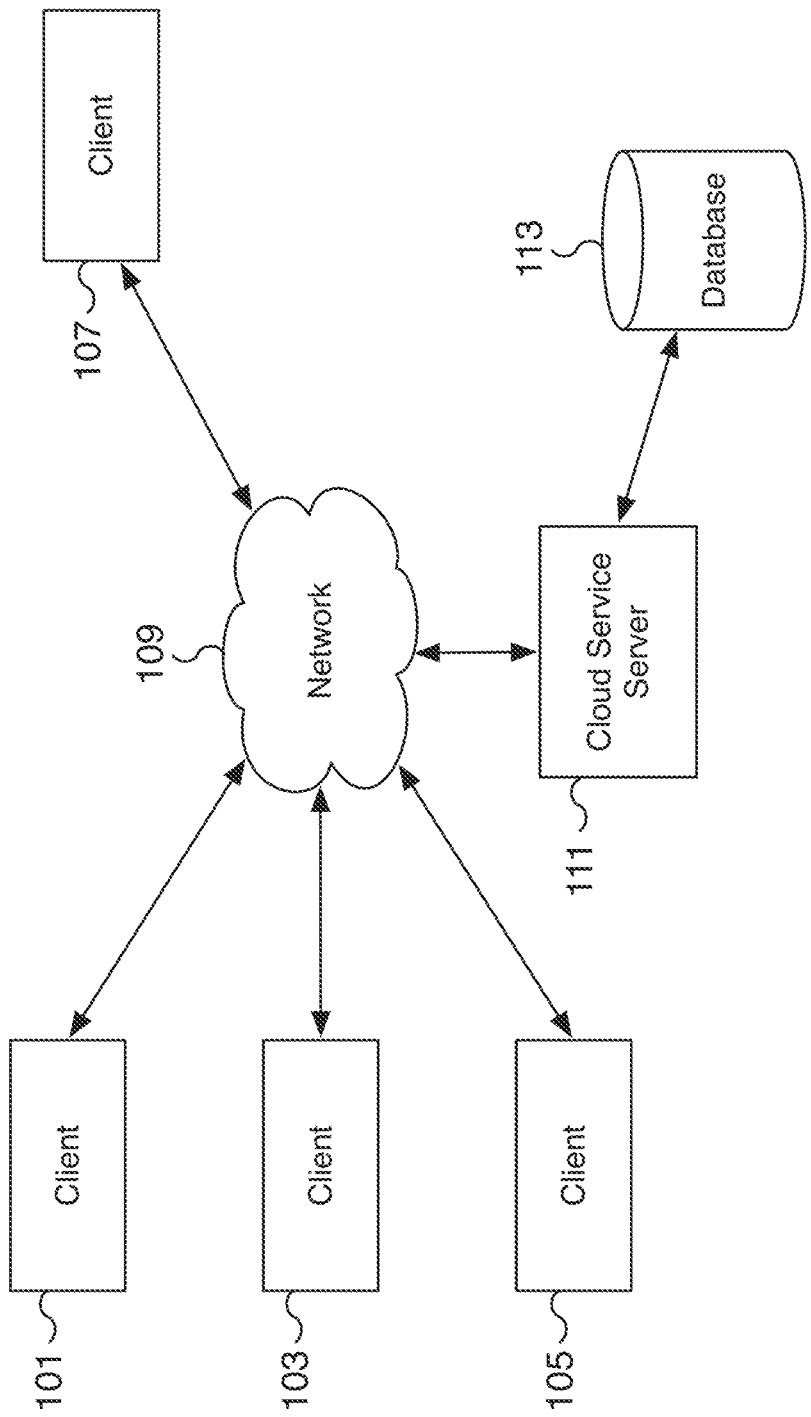
FIG. 1 is a block diagram illustrating an example of a network environment for an application utilizing dynamic client-side user interface behaviors.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic client-side user interface behaviors for a computer application are disclosed. Using the techniques described herein, the user interface of a client application can be dynamically updated. For example, a mobile application can retrieve customer data from a cloud service for display on the mobile client. By applying dynamic client-side user interface behaviors, a user interface view of the client application can manipulate the received customer data. For example, data corresponding to a date retrieved using a system time format can be displayed as the number of hours since the current date, in month-day-year format, in day-month-year format, using only the month and day, as the day of the week, or using another appropriate and configurable format. In various embodiments, as part of a user interface rule, a conditional test is performed before applying one or more user interface actions. For example, the background color of a ticket description can be changed to highlight the description only in the event the date corresponding to a deadline for the ticket is more than three days old. The client-side operation to modify the display of the ticket description as shown in the user interface is performed based on the result of a conditional check on the ticket's date. In the event the ticket date exceeds the configured threshold, the background display parameter of the ticket description is changed to a configured highlight color. In various embodiments, one or more different actions can be configured to be performed in the event the conditional check fails, for example, in the event the ticket date does not exceed the configured threshold. In addition to modifications to the formatting and display of user elements, complex client-side operations can be performed. For example, a cost field of a user interface view can be filled by applying a defined user interface action that changes the cost to the correct currency. For example, a user interface currency change action can convert the cost from dollars to euros by applying the correct foreign exchange rate to the cost data.

In various embodiments, client-side user interface behaviors are provided to the client application by a cloud service provider. The client-side user interface behaviors can be provided as user interface rules and associated user interface actions. Each rule can specify at least a trigger event and a trigger condition. For example, a trigger event can include retrieving data from a cloud provider, loading a user interface screen or view, refreshing a user interface screen or view, the modification of a user interface field, or another appropriate event. In the event a configured trigger event occurs, a trigger condition is tested. For example, a trigger condition can to configured to test whether a customer item record is overdue. In various embodiments, the trigger condition returns a Boolean result. Based on the trigger condition result, an associated user interface action is executed to modify the user interface. In some embodiments, the user interface action includes or references a script such as a JavaScript snippet or another similar program block that can be executed or interpreted.

In some embodiments, the user interface rules and actions are configured by an administrator via a cloud service such as a web application. For example, an administrator for each customer can configure different customized user interface behaviors by specifying user interface rules and associated actions. In some embodiments, multiple rules can be attached to each user interface view. The attached rules can be ordered to execute in a defined order. Similarly, for each rule, one or more actions can be configured. The associated actions can also be configured to execute in a defined order based on the result of a trigger condition. In various embodiments, the user interface rules and actions for an application are encoded and provided to the application at run-time. For example, an application can retrieve the most up to date rules and actions on demand, such as anytime the application loads a new user interface screen or view or retrieves customer data. New and/or updated rules and actions can be provided to a client without having to rebuild or redistribute the client application.

In various embodiments, the client application receives user interface rules and actions dynamically. For example, an administrator can configure a new user interface rule and/or action to modify the behavior of the client application. Without having to rebuild and redistribute the client application, the client application will retrieve the new user interface rules and applicable actions and apply them to the user interface. For example, the threshold for an overdue date can be changed from three days to a week and a background highlight color for overdue tasks can be changed from yellow to red. In various embodiments, the user interface rules and actions are retrieved dynamically from the client application via a web request. The rules and actions can be encoded, for example, using an interchange format such as JavaScript Object Notation (JSON) interchange format, and decoded by the client application where the rules and actions are applied.

In some embodiments, a specification of a client-side user interface behavior for a view of a computer application is received from a representative of an organization. For example, an administrator of an organization configures a user interface behavior that is performed by a client. The client-side user interface behavior is configured to modify the view of a computer application such as a mobile application. For example, a client-side user interface behavior can change the display format of a date. As another example, a client-side user interface behavior can modify the background color of a description label. As yet another example, a client-side user interface behavior can hide a detailed description when the status of a time entry is complete. The configured rules and/or actions are received as a specification and stored. For example, the specification of a client-side user interface behavior can be stored in a customer database such as a database associated with a configuration management database (CMDB) hosted by a cloud service provider for an organization. In some embodiments, a request is received via a network for content of the view from the computer application associated with a user that belongs to the organization. For example, a client mobile application is customized for an organization and deployed to mobile devices of employees of the organization. When the application is used by employees, the application requests content from a cloud service provider that is hosting the organization's content. The content is transmitted to the client mobile application where it is used to populate a user interface view of the application. In some embodiments, the received specification is identified as being associated with the requested content of the view. For example, the specification configuring a user interface rule is identified as applying to the requested content of the user interface view of the application. The requested content and an identifier of the identified specification of the client-side user interface behavior is provided. For example, the requested content is retrieved by the cloud service provider and transmitted to the computer application. Either with or separate from the provided content, an identifier of the identified specification, such as an identifier associated with the user interface behavior, is provided to the computer application. The computer application utilizes the received identifier of the identified specification of the client-side user interface behavior to modify the view of the computer application. For example, the identifier allows the application to apply the correct user interface behavior, such as the correct user interface rule with the appropriate user interface action. In some embodiments, in addition to an identifier of the identified specification, the entire specification is provided, for example, as a dynamic update to modify the user interface.

FIG. 1 is a block diagram illustrating an example of a network environment for an application utilizing dynamic client-side user interface behaviors. In the example, clients 101, 103, 105, and 107 and cloud service server 111 are communicatively connected via network 109. Network 109 can be a public or private network. In some embodiments, network 109 is a public network such as the Internet. In some embodiments, clients 101, 103, 105, and 107 are on a private local network separate from cloud service server 111. In the example shown, cloud service server 111 is communicatively connected to database 113. Cloud service server 111 and database 113 may be on the same network and/or hosted in the same datacenter or connected via another topology than the one shown. In various embodiments, cloud service server 111 utilizing database 113 hosts cloud services such as a web application for configuring and/or deploying applications such as end-user mobile applications. Cloud service server 111 utilizing database 113 can also host customer data that is dynamically served to deployed applications. The applications can dynamically modify their user interface based on the provided content using client-side user interface behaviors. In various embodiments, cloud service server 111 provides client-side user interface behaviors for the configured and deployed applications, which can be used to update user interface views of already deployed applications. In some embodiments, cloud service server 111 hosts configuration management database (CMDB) services. Additional services provided by cloud service server 111 can include resource discovery, resource management, event management, cloud management, maintenance, and compliance services, among others. In the various scenarios, database 113 can be utilized to store data related to the cloud-hosted services offered by cloud service server 111.

In some embodiments, clients 101, 103, 105, and 107 are example client systems used to connect to cloud services offered by cloud service server 111. Clients 101, 103, 105, and 107 may have different software/hardware configurations and can include laptops, desktop computers, mobile devices, tablets, kiosks, smart televisions, or other appropriate computing devices. In some embodiments, the clients are used to configure a computer application, such as an end-user mobile application by at least in part configuring client-side user interface behaviors hosted by a cloud service. In some embodiments, the computer application is automatically generated and deployed to clients, such as clients 101, 103, 105, and 107. The computer application can access cloud service server 111 to dynamically retrieve data from database 113. The retrieved data can include customer content for displaying in user interface views of the computer application as well as client-side user interface behaviors to dynamically modify the user interface views of the computer application. For example, a computer application running on a client such as clients 101, 103, 105, and 107 can retrieve from cloud service server 111 one or more updated client-side user interface behaviors to dynamically update a user interface view of the computer application.

In some embodiments, database 113 is utilized by cloud service server 111 to store information relevant to clients 101, 103, 105, and 107, such as customer data that is dynamically retrieved by a client computer application. The data can include data organized and stored across multiple related tables. As one example, the generated application can be an incident tracking application. The stored data can include incident information and can include information related to the owner of the incident it is assigned to, the progress status of an incident, the date the incident was filed, a description of the incident, and an incident identifier, among other information. In some embodiments, database 113 stores user interface behaviors configured for computer applications. The stored user interface behaviors can include user interface rules and user interface actions. For example, user interface rules can be associated with customized computer applications for each customer accessing the cloud services of cloud service server 111 and user interface actions can be associated with one or more different user interface rules.

In some embodiments, database 113 is a CMDB database. For example, database 113 can be used to store resource discovery information as part of a CMDB service for managing client resources. The CMDB data can be organized by categories and displayed/managed via a customized computer application for each customer of a cloud-based service. Although database 113 is shown connected to cloud service server 111, database 113 may be located in a variety of network locations as appropriate. For example, database 113 may be located external to a local network that includes clients 101, 103, 105, and 107. In some embodiments, database 113 is not directly connected to cloud service server 111 but only communicatively connected to cloud service server 111. In some embodiments, database 113 is a cloud-based database server and may be part of and/or collocated with cloud service server 111.

Although single instances of some components have been shown to simplify the diagram of FIG. 1, additional instances of any of the components shown in FIG. 1 may also exist. For example, cloud service server 111 may include one or more different servers and/or multiple distributed components. Moreover, different cloud service functionality provided by cloud service server 111 may be distributed across different cloud service server instances and/or processing components. Similarly, database 113 may include one or more database servers and may not be directly connected to cloud service server 111. For example, database 113 and its components may be replicated and/or distributed across multiple servers, components, and/or locations. In some embodiments, components not shown in FIG. 1 may also exist.

Figure 2:
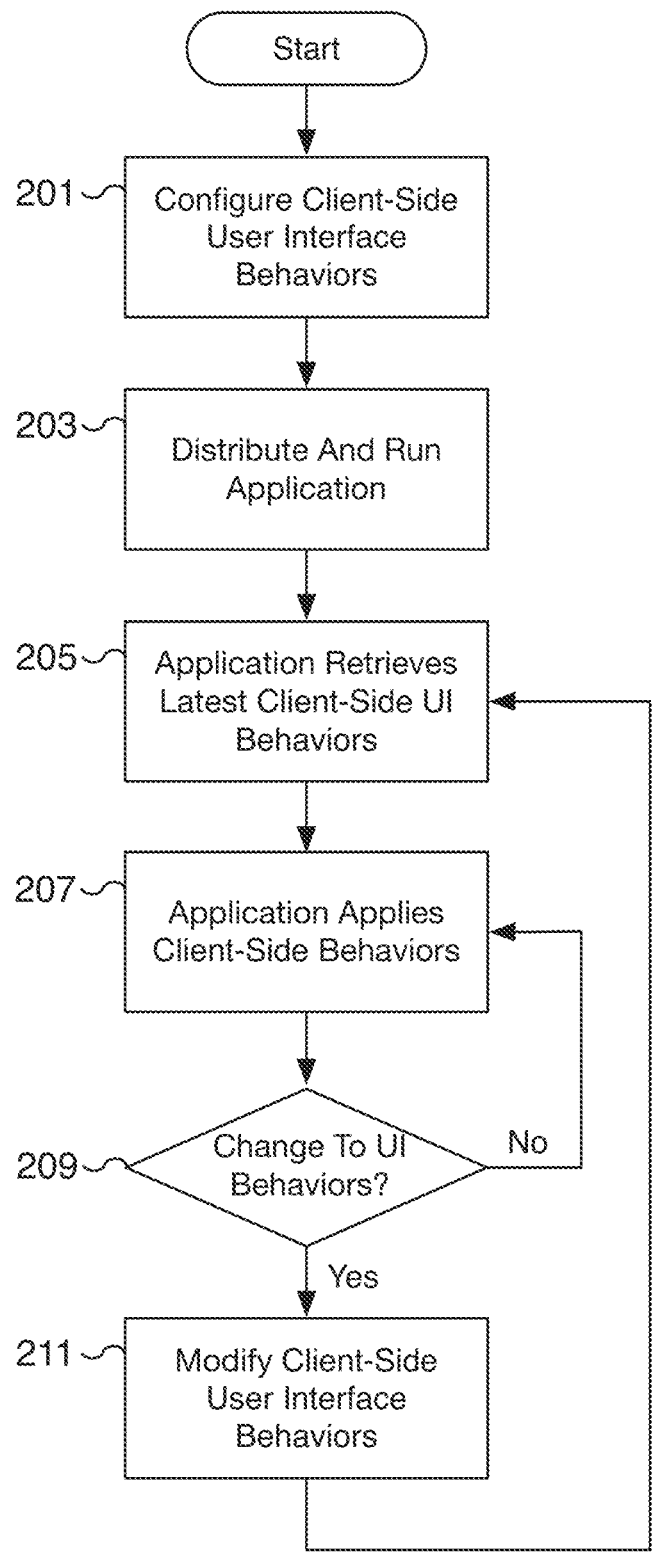
FIG. 2 is a flow chart illustrating an embodiment of a process for configuring and applying dynamic client-side user interface behaviors for a computer application.

FIG. 2 is a flow chart illustrating an embodiment of a process for configuring and applying dynamic client-side user interface behaviors for a computer application. Using the process of FIG. 2, an administrator, such as a representative of an organization, with little to no programming experience can configure a client-side user interface behavior to modify the user interface of a computer application. In some embodiments, the computer application is automatically generated and deployed to target client devices such as mobile phones, laptops, and desktops, among others. The configured client-side behaviors can be retrieved dynamically by the deployed computer application and applied to one or more user interface views of the application. In various embodiments, the deployed computer application is a graphical user interface application that retrieves and applies client-side behaviors to modify the application's user interface based on content data associated with an organization. The content data can be retrieved from a local store of the client or dynamically via a cloud service. In some embodiments, the process of FIG. 2 is performed via clients such as clients 101, 103, 105, and 107 of FIG. 1 by accessing a cloud service server such as cloud service server 111 of FIG. 1. In some embodiments, the data associated with the process is stored in a database such as database 113 of FIG. 1.

At 201, client-side user interface behaviors are configured. For example, an administrator such as a representative of an organization configures one or more client-side user interface behaviors using a web form of a cloud service. Each user interface behavior can specify a user interface view of a computer application and one or more user interface actions. For example, a user interface rule can specify one or more trigger events and one or more trigger conditions. In the event a trigger event occurs and a trigger condition is met, an associated user interface action is performed to modify the user interface view of the computer application. In various embodiments, the client-side user interface behaviors can be dynamically retrieved from the computer application. In various embodiments, the client-side user interface behaviors can be configured both before and after a computer application is distributed and run at 203.

At 203, a computer application is distributed and run. For example, the application is deployed to clients such as client mobile devices, laptops, desktops, and other appropriate computing platforms. In some embodiments, the computer application is a mobile application that is configured via a web form of a cloud service. The computer application can be automatically generated and customized for a customer, for example, by a representative of an organization. In various embodiments, the computer application processes and displays customer data that can be retrieved from a cloud service and/or stored or cached locally on the computing device running the application.

At 205, the computer application retrieves the latest client-side user interface behaviors. For example, the latest client-side user interface behaviors are provided by a cloud provider to the computer application. In some embodiments, the behaviors are provided in response to a request by the computer application. The request may specify a user interface view and/or customer content data that is used to identify the relevant client-side user interface behaviors that are retrieved. The behaviors can include one or more user interface rules and/or one or more user interface actions. In some embodiments, the retrieved user interface behaviors are encoded using a format such as JavaScript Object Notation (JSON) interchange format. Each provided user interface behavior can include a unique identifier.

At 207, the computer application applies client-side user interface behaviors. For example, the user interface behaviors relevant to the current user interface are applied. In some embodiments, one or more user interface rules are applied to active or current user interface views. The user interface rule can trigger the execution of one or more user interface actions to modify the user interface. Examples of modifications include changing the display format of a user interface label such as the font, font size, font color, background color, or visibility. As another example, a user interface label can be set to the result of a configured computation of a user interface action such as a currency conversation from one unit (e.g., dollars) to another unit (e.g., euros).

At 209, a determination is made whether there are changes to user-interface behaviors. In the event there are changes to user-interface behaviors, processing proceeds to step 211. In the event there are no changes to user-interface behaviors, processing proceeds to step 207 where the application applies client-side user interface behaviors.

At 211, client-side user interface behaviors are modified. For example, an administrator such as the administrator of 201 modifies the client-side user interface behaviors applicable to the computer application. New client-side user interface behaviors can be added and/or existing ones modified or removed. In various embodiments, the behaviors are modified using a web form of a cloud service. For example, the behaviors are modified independent of execution of the computer application by a representative of the organization. In various embodiments, the client-side user interface behaviors are modified in a similar manner as the client-side user interface behaviors are configured at 201. For example, new user interface rules and/or actions can be associated with a user interface view of the computer application.

Figure 3:
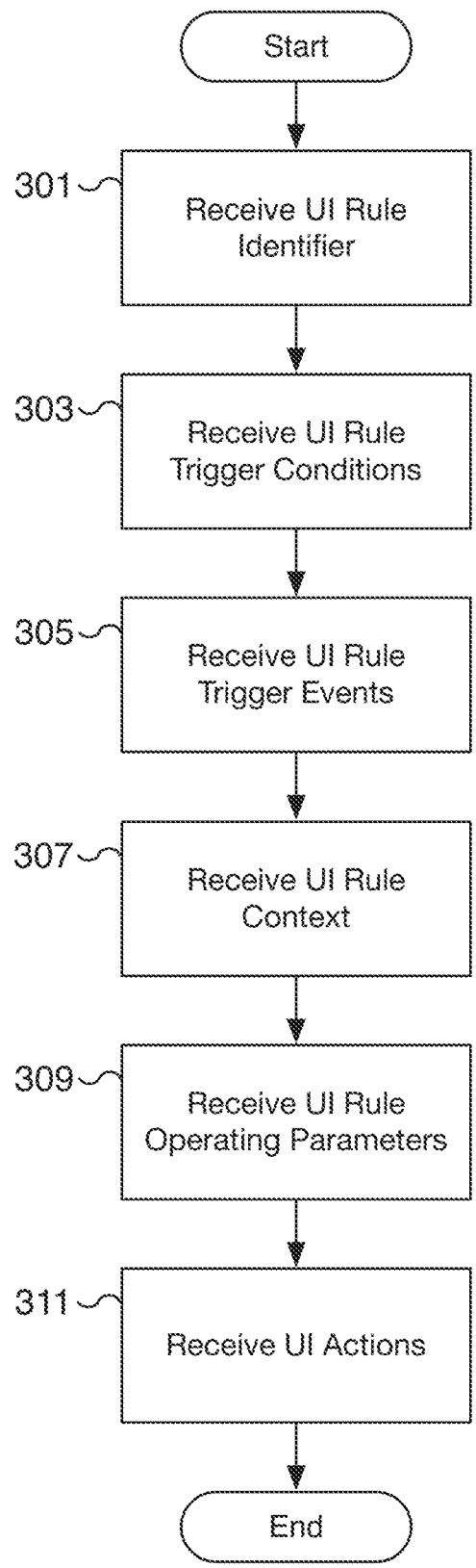
FIG. 3 is a flow chart illustrating an embodiment of a process for configuring a dynamic client-side user interface behavior for a computer application.

FIG. 3 is a flow chart illustrating an embodiment of a process for configuring a dynamic client-side user interface behavior for a computer application. Using the process of FIG. 3, a cloud service provider receives the configuration specification for a dynamic client-side user interface behavior. In some embodiments, the received configuration information is provided by an administrator, such as a representative of an organization, with little to no programming experience via a web form or web application offered by a cloud service. The provided configuration information is used to encode a client-side user interface behavior that is used by a client application to modify its user interface. For example, configured client-side behaviors can be provided dynamically to the computer application and applied by the application to one or more user interface views of the application. In some embodiments, the process of FIG. 3 is performed at 201 and/or 211 of FIG. 2. In some embodiments, the process of FIG. 3 is performed by a cloud service server such as cloud service server 111 of FIG. 1 in response to configuration information provided via clients such as clients 101, 103, 105, and 107 of FIG. 1. In some embodiments, the configured user interface behavior is stored in a database such as database 113 of FIG. 1.

At 301, an identifier for a user interface rule is received. For example, a unique identifier such as a name is provided by an administrator, such as a representative of an organization, for creating and identifying a new user interface rule to customize a computer application. In some embodiments, the identifier is a unique numeric identifier and corresponds to a key in a database field. In some embodiments, the identifier is associated with a name provided for the user interface rule. In some embodiments, an identifier for a user interface rule is automatically assigned.

At 303, trigger conditions for the user interface rule are received. For example, one or more trigger conditions are received that specify the conditions to be evaluated for the user interface rule. In some embodiments, the supported conditions and fields/values they operate on are automatically populated in a configuration user interface and a user can select from the provided options to construct a trigger condition. For example, a trigger condition received can include the condition "state=In Progress" or "state=Complete." In various embodiments, a received trigger condition is evaluated by a computer application when the user interface rule is triggered by a trigger event. When evaluated, a trigger condition determines a Boolean conditional result used to determine whether or not to execute a user interface action.

At 305, trigger events for the user interface rule are received. For example, one or more trigger events are received that specify which events trigger the start of an evaluation of the user interface rule. Example trigger events can include user interface events and application events. In some embodiments, trigger events include an onLoad event, an onChange event, an onSubmit event, an onEdit event, and an onRefresh event, among others. In various embodiments, more or fewer trigger events can be supported. In some embodiments, the supported trigger events are automatically populated in a configuration user interface and a user can select from the provided options to specify the applicable trigger events.

At 307, a context for the user interface rule is received. For example, a context for applying the user interface rule is received. In some embodiments, the context is a user interface view of the application and/or a specific table associated with a user interface element. For example, a user can specify that a user interface rule should be applied to the "Incident Item View" of the computer application's user interface. By specifying this context, the configured user interface rule can be applied whenever the "Incident Item View" is accessed by the computer application. In some embodiments, the user interface view context is selected by providing a name of the corresponding view. In some embodiments, a list of candidate views is automatically populated in a configuration user interface and a user can select from the provided options to specify the context of the user interface rule. In some embodiments, the candidate views are stored in a database table used for configuration of the computer application.

At 309, operating parameters for the user interface rule are received. For example, operating parameters that specify how to evaluate the user interface rule and its results are received. In various embodiments, configuration settings for the various operating parameters, such as an active flag, a debug flag, an order parameter, and/or a "reverse action if false" flag, among others are received as part of the user interface behavior specification. In some embodiments, an active flag can be configured to activate or deactivate the rule. In some embodiments, a debug flag can be configured to enable a debug mode for the rule. In some embodiments, a unique order parameter can be configured to specify the order of precedence of the configured rule, for example, with respect to other user interface rules. The order parameter may be specified as a unique number which determines the order the different rules are evaluated when multiple rules exist. In some embodiments, a "reverse action if false" flag can be configured. A "reverse action if false" flag can be used to enable an action to be applied when the trigger condition result evaluates to a false result. In some embodiments, the "reverse action if false" flag is labeled as a "reverse if false" flag or another appropriate name.

At 311, user interface actions for the user interface rule are received. For example, one or more user interface actions are received that can be executed based on the evaluation result of the user interface rule. In some embodiments, each user interface action received is associated with a unique order parameter. The order parameters allow multiple actions associated with the same user interface rule to be executed in a deterministic order. In some embodiments, a reversible flag is configured for a user interface action. The reversible flag can be used to determine whether and how the user interface action should function based on the conditional result of the user interface rule. For example, in the event a trigger conditional result evaluates to a false result and the rule is reversable, the reverse action of the user interface action can be performed by enabling the reversible flag. In various embodiments, user interface actions received can be configured by a user as new user interface actions and/or selected from a set of existing user interface actions. For example, user interface actions can be configured, shared, and reused across multiple user interface rules, applications, and/or customers.

Figure 4:
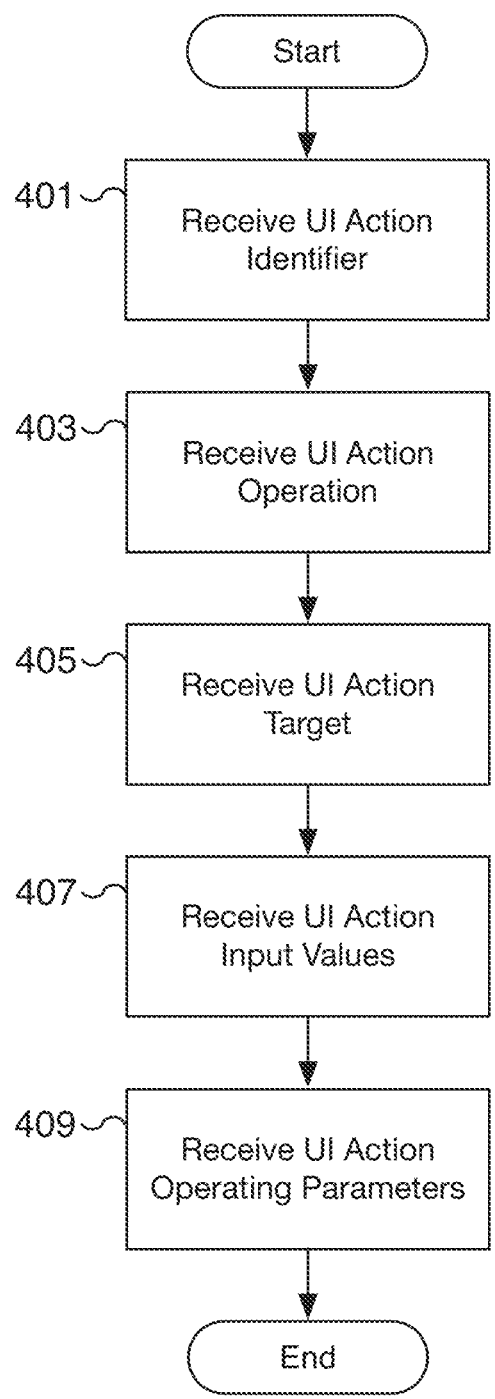
FIG. 4 is a flow chart illustrating an embodiment of a process for configuring a user interface action for a dynamic client-side user interface behavior.

FIG. 4 is a flow chart illustrating an embodiment of a process for configuring a user interface action for a dynamic client-side user interface behavior. Using the process of FIG. 4, a cloud service provider receives the configuration specification for a user interface action which can be associated with a user interface rule and applied to a user interface view of a computer application. In some embodiments, the received configuration information is provided by an administrator, such as a representative of an organization, with little to no programming experience via a web form or web application offered by a cloud service. The provided configuration information is used to encode a user interface action, which can be shared and reused across user interface views, computer applications, and/or customers. In some embodiments, the process of FIG. 4 is performed at 311 of FIG. 3 and/or independent of the process of FIG. 3 for configuring a user interface rule. For example, a user interface action can be configured using the process of FIG. 4 and only once it is configured is the user interface action associated with a user interface rule at 311 of FIG. 3. In some embodiments, the process of FIG. 4 is performed by a cloud service server such as cloud service server 111 of FIG. 1 in response to configuration information provided via clients such as clients 101, 103, 105, and 107 of FIG. 1. In some embodiments, the configured user interface action is stored in a database such as database 113 of FIG. 1.

At 401, an identifier for a user interface action is received. For example, a unique identifier such as a name is provided by an administrator, such as a representative of an organization, for creating and identifying a new user interface action to customize a computer application. In some embodiments, the identifier is a unique numeric identifier and corresponds to a key in a database field. In some embodiments, the identifier is associated with a name provided for the user interface rule. In some embodiments, an identifier for the user interface action is automatically assigned.

At 403, an operation for the user interface action is received. For example, an operation to perform, such as an applyStyle operation, is received. In various embodiments, the operation has been granted access privileges to modify the target specified at 405 using the input values received at 407. In some embodiments, a list of available operations automatically populates a user interface and a user selects one or more appropriate operations. Other examples of operations can include setMandatory, setReadOnly, setVisible, and/or setValue, among others. In various embodiments, more or fewer operations can be supported. In some embodiments, the operation received is a client-side function such as a client-side JavaScript function that can manipulate the user interface of the computer application.

At 405, a target for the user interface action is received. For example, a target user interface element is selected and received as part of the user interface action specification. In some embodiments, the received target references a user interface element or field of a user interface view that will be modified. The received target is configured as the destination target or output of the user interface action. For example, a short_description field can be set as the target of the operation configured at 403 and the result from executing the operation can be applied to the short_description field. The operation can correspond to setting the short_description field invisible, visible, changing the background color, changing the font size, changing the contents of the field, or another appropriate action. As another example, a system_time_ago_format field used to display a relative time based on the current time can be received as a target. Depending on the specified operation configured at 403, different time formats can be displayed in the target field. In some embodiments, a list of available targets automatically populates a user interface and a user selects one or more appropriate targets that are received at 405.

At 407, input values for the user interface action are received. In various embodiments, the input values received are used as input values to the operation received at 403. For example, an input value "true" can be received and used as an input value to a setVisible operation received at 403. The combination of a setVisible operation received at 403, a target field received at 405, and a "true" input value received at 407 defines an action that makes the target field visible. As another example, a background color (e.g., {"Background-Color":"#FFA4A3"}) can be received and used as the input value to an applyStyle operation received at 403. This combination would correspond to an action to set the background color of the corresponding target field received at 405. In some embodiments, reverse input values are received for the reverse action of the user interface rule. For example, in the event a user interface rule condition evaluates to a true result, the default action input values are used. In the event the user interface rule condition evaluates to a false result, the reverse action input values are used. In some embodiments, the input values received are expressions such as a function or mathematical equation that references variables. For example, the input value received can be the expression "weight*price_per_pound" where the variables weight and price_per_pound are values retrieved from customer content data. When the expression is evaluated, a retrieved weight value is multiplied by a retrieved price_per_pound value to determine a total price for a particular item by weight.

At 409, operating parameters for the user interface action are received. For example, operating parameters that specify how to execute the user interface action are received. In various embodiments, configuration settings for the various operating parameters, such as an active flag, a debug flag, an order parameter, and a reversible flag, among others are received as part of the user interface action specification. In various embodiments, more or fewer operating parameters may be supported. In some embodiments, an active flag can be configured to activate or deactivate the action. In some embodiments, a debug flag can be configured to enable a debug mode for the action. In some embodiments, a unique order parameter can be configured to specify the order of precedence of the configured action, for example, with respect to other user interface actions. In some embodiments, the order parameter is specified when associating the user interface action with a user interface rule, for example, at 311 of FIG. 3. The order parameter may be specified as a unique number which determines the order the different rules are evaluated when multiple rules exist. In some embodiments, a reversible flag can be specified that allows an action to be executed using inverted (or reversed) input arguments. In various embodiments, only user interface actions that have the reversible flag enabled can be configured to be reversible when associated with a user interface rule. For example, a single operation such as setVisible that accepts a Boolean input value is reversible. When configured with the input value "true," the reversed action is to apply the setVisible operation with the input value "false." When the reversible flag is enabled for the action, the action can be made reversible when associated with a user interface rule at 311 of FIG. 3. In some embodiments, the reversible flag is automatically enabled for any operation that is reversible. For example, any operation that takes a Boolean input value can have the reversible flag automatically enabled. For certain operations, such as an applyStyle operation, there may be no equivalent reverse action and the reversible flag is automatically disabled.

Figure 5:
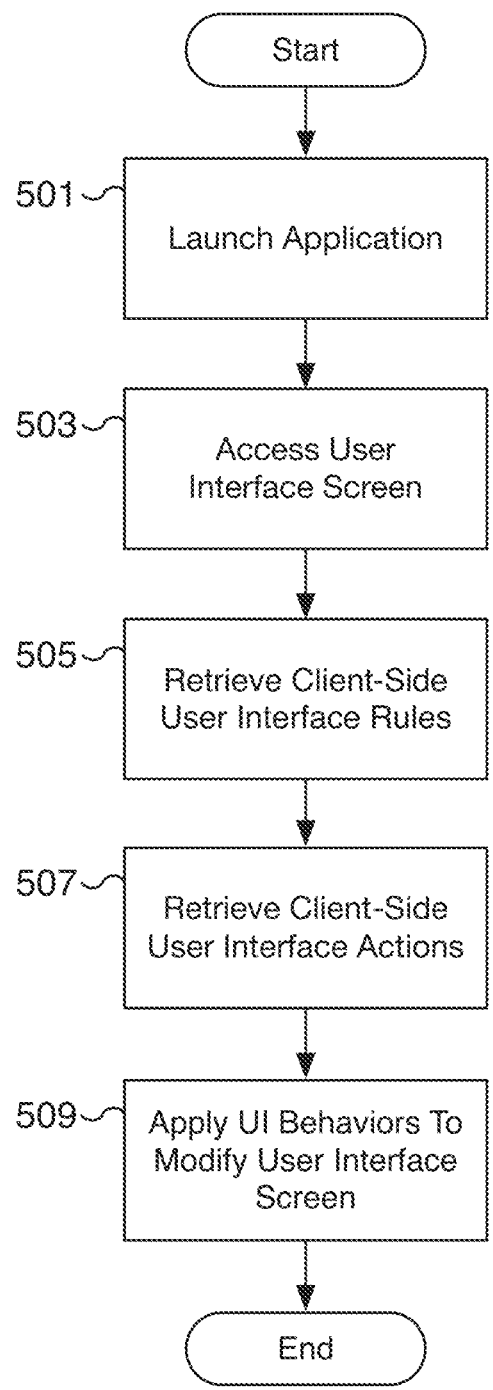
FIG. 5 is a flow chart illustrating an embodiment of a process for applying a dynamic client-side user interface behavior to a computer application.

FIG. 5 is a flow chart illustrating an embodiment of a process for applying a dynamic client-side user interface behavior to a computer application. Using the process of FIG. 5, a computer application can dynamically manipulate its user interface by applying dynamic client-side user interface behaviors. The dynamic client-side user interface behaviors can be stored locally on the device of the application and/or can be updated as required by retrieving updated behaviors from a cloud service. The client-side user interface behaviors of a computer application can be dynamically updated and do not need to be defined at the time the application is compiled and distributed to clients. For example, an administration can modify, remove, and/or add client-side user interface behaviors to modify the user interface of a computer application without rebuilding or redeploying the application to clients. In various embodiments, the latest user interface behaviors can be provided by a cloud service to a computer application to apply when an associated user interface screen or view is accessed. In some embodiments, the process of FIG. 5 is performed at 203, 205, and/or 207 of FIG. 2. In some embodiments, the dynamic client-side user interface behaviors are provided by a cloud service server such as cloud service server 111 of FIG. 1 to a computer application running on a client such as one of clients 101, 103, 105, and 107 of FIG. 1. In some embodiments, the latest dynamic client-side user interface behaviors are stored in a database such as database 113 of FIG. 1.

At 501, a computer application is launched. For example, a computer application customized for an organization is launched by an employee of the organization. In some embodiments, the computer application is a mobile application that runs on a mobile device. In various embodiments, the application is automatically generated using a configuration provided by an administrator, such as a representative of the organization. In some embodiments, the computer application has access to a computing network such as the Internet and can communicate with a cloud service to access and retrieve content data and update user interface behaviors. In some embodiments, the computer application does not have network access and operates in an offline mode using content data and user interface behaviors stored local to the computing device.

At 503, a user interface screen is accessed. For example, a user interface screen is accessed by an employee of an organization to access content data of the organization. The accessed user interface screen may be composed of one or more user interface views and/or user interface elements. For example, a user interface view can be configured to display multiple items or records from a customer database, such as relevant incident reports assigned to the employee accessing the application. As another example, the user interface screen can be configured to display timesheet entries for the employee running the application. In various embodiments, at 503, content data associated with the user interface screen is retrieved. For example, the content data can be retrieved from a local store and/or from a cloud service in response to a content data request.

At 505, client-side user interface rules are retrieved. For example, one or more client-side user interface rules are retrieved locally and/or from a cloud service. The user interface rules retrieved can be provided in response to a request generated by the computer application. In some embodiments, the request is based on the user interface screen accessed at 503 and/or the content data associated with the user interface screen accessed at 503. In various embodiments, the client-side user interface rules retrieved are encoded using an interchange format such as JavaScript Object Notation (JSON) interchange format. In some embodiments, the user interface rules are provided with an identifier for each rule, such as a unique identifier, along with an encoding of the rule specifying parameters such as one or more trigger conditions, one or more trigger events, and associated user interface actions. In the event the computer application is operating in an offline mode, cached or locally stored user interface rules are retrieved. In the event the computer application has access to a network connection, user interface rules retrieved from a cloud service can be used to update the locally stored rules.

At 507, client-side user interface actions are retrieved. For example, one or more client-side user interface actions are retrieved locally and/or from a cloud service. The user interface actions retrieved can be provided in response to a request generated by the computer application. The request may be based on the user interface rules applicable to the user interface screen and/or content data accessed at 503. For example, the only user interface actions retrieved at 507 may be the actions necessary to evaluate the relevant user interface rules retrieved at 505. In some embodiments, the user interface actions received are encoded along with the corresponding user interface rules. For example, the user interface rules retrieved at 505 and user interface actions retrieved at 507 are encoded together and received as a packaged response. In various embodiments, the client-side user interface actions retrieved are encoded using an interchange format such as JavaScript Object Notation (JSON) interchange format. In the event the computer application is operating in an offline mode, cached or locally stored user interface actions are retrieved. In the event the computer application has access to a network connection, user interface actions retrieved from a cloud service can be used to update the locally stored actions.

At 509, user interface behaviors are applied to modify the user interface screen. For example, the user interface rule retrieved at 505 and the corresponding user interface actions retrieved at 507 are used to apply a user interface behavior to the user interface screen accessed at 503. In various embodiments, a rule is evaluated to determine a conditional result. Based on the conditional result, one or more actions are executed to modify the user interface screen. In some embodiments, the results modify a user interface element or view of the user interface screen as specified by the user interface behavior. For example, based on an applied user interface behavior, the user interface screen can be modified to display the time associated with incident reports assigned to an employee using a relative time format such as days since the current date. Another applied user interface behavior can modify the user interface screen to highlight incidents that exceed a configured threshold such as three days by modifying the background color of the incident title. Similarly, user interface elements for displaying the detailed descriptions of incidents can have their visibility setting set to "false" in the event the incident has already been resolved by applying a different user interface behavior. This behavior dynamically hides the detailed descriptions for non-active incidents. In various embodiments, the user interface behaviors are evaluated and applied at 509 based on the occurrence of a triggered event described by the user interface rule. Examples of triggering events can include the loading of a user interface view, the setting of a field value, the refreshing of content, or another application or user interface event.

Figure 6:
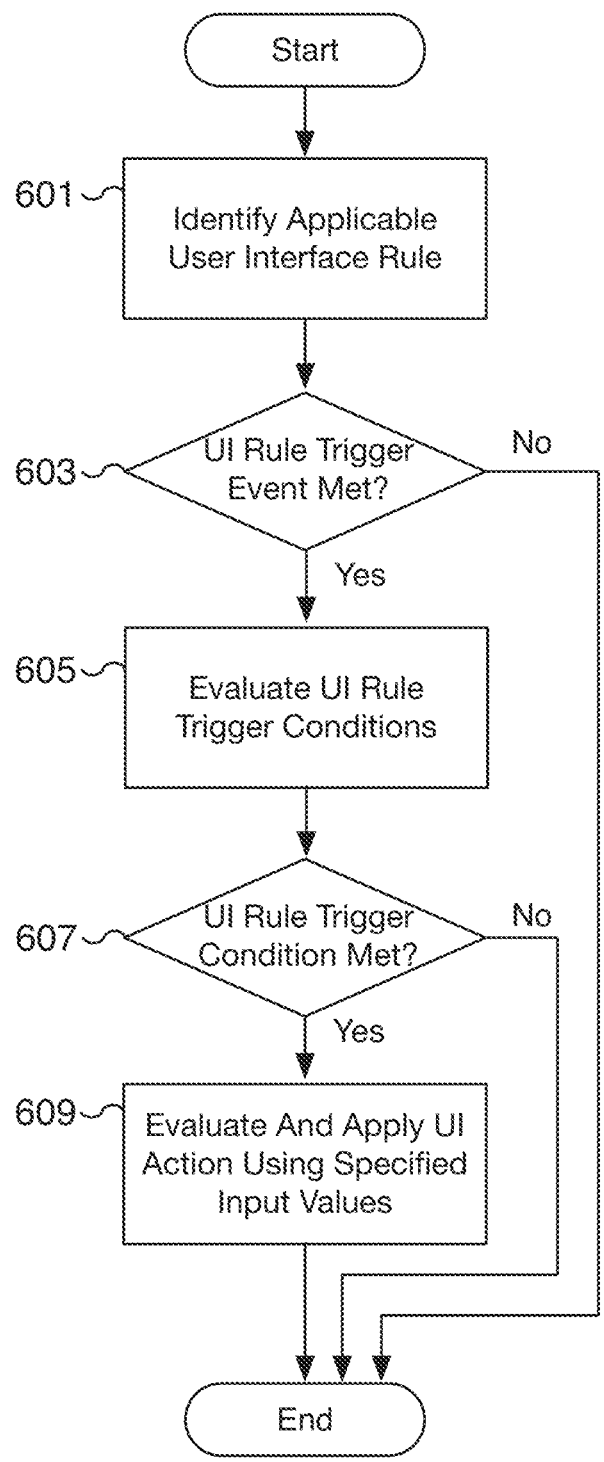
FIG. 6 is a flow chart illustrating an embodiment of a process for applying a user interface rule to perform a dynamic client-side user interface behavior.

FIG. 6 is a flow chart illustrating an embodiment of a process for applying a user interface rule to perform a dynamic client-side user interface behavior. Using the process of FIG. 6, a computer application can dynamically manipulate its user interface based on the evaluation of a user interface rule and the application of a user interface action associated with the rule. In some embodiments, the user interface rule and associated user interface action make up a client-side user interface behavior that is evaluated when a user interface screen or view is accessed in a computer application. The user interface rules and actions of a computer application can be dynamically updated and do not need to be defined at the time the application is compiled and distributed to clients. For example, an administration can modify, remove, and/or add user interface rules and/or actions to modify the behavior of a computer application without rebuilding or redeploying the application to clients. In various embodiments, the latest user interface rules and actions can be provided by a cloud service to a computer application to apply when an associated user interface screen or view is accessed. In some embodiments, the process of FIG. 6 is performed at 207 of FIG. 2 and/or at 509 of FIG. 5. In some embodiments, the user interface actions and rules are provided by a cloud service server such as cloud service server 111 of FIG. 1 to a computer application running on a client such as one of clients 101, 103, 105, and 107 of FIG. 1. In some embodiments, the latest user interface actions and rules are stored in a database such as database 113 of FIG. 1.

At 601, an applicable user interface rule is identified. For example, the user interface rules associated with an accessed application user interface are identified. In some embodiments, the rules are associated with a user interface view during the configuration of user interface behaviors for the computer application using the process of FIG. 3. For example, an identifier of a user interface rule is associated with an identifier of the user interface, such as an identifier for a user interface view or user interface element. When the associated user interface view is accessed, the identifier of the user interface rule is used to retrieve the corresponding specification of the user interface rule. In various embodiments, multiple user interface rules can be associated with the same user interface view. In some embodiments, the applicable rules are identified by the content requested and/or accessed for a user interface view.

At 603, a determination is made whether a trigger event of a user interface rule is met. In the event a trigger event of a user interface rule is met, processing proceeds to step 605. In the event no trigger event of a user interface rule is met, processing completes, and no additional processing is needed for the identified user interface rule. In various embodiments, trigger events include user interface and/or application events, among others. Examples of trigger events include an onLoad event, an onChange event, an onSubmit event, an onEdit event, and an onRefresh event, among others.

At 605, trigger conditions for the user interface rule are evaluated. For example, the trigger conditions configured for the user interface rule are evaluated to determine whether or not a trigger condition has been met and associated user interface actions should be applied. When a trigger condition is met, the corresponding user interface action is executed. When a trigger condition is not met, the corresponding user interface action is not applied, and the user interface is not modified. In various embodiments, the trigger conditions evaluate to a true result to meet the trigger condition and a false result to not meet the trigger condition. A true result meets the trigger condition and results in applying the configured user interface action using the default input values configured for the action. However, in some embodiments, a trigger condition can be met regardless of whether the trigger condition evaluates to a true result or a false result. In the event a user interface rule has a "reverse action if false" flag enabled, both a true result and false result will meet the trigger condition to apply the user interface action. When the "reverse action if false" flag is enabled, a false result meets the trigger condition and results in applying the configured user interface action using reversed (or inverted) input values. For example, in the event a default input value for an action is "true," the reversed input value is "false." For an action that applies a setVisible operation, the default input value of "true" sets a target to be visible (e.g., a visible parameter is set to true). In the event the "reverse action if false" flag is enabled, the reverse input value sets a target to be hidden (e.g., a visible parameter is set to false, the inverse of a default input value of "true").

At 607, a determination is made whether a trigger condition of a user interface rule is met. In the event a trigger condition of a user interface rule is met, processing proceeds to step 609. In the event no trigger condition of a user interface rule is met, processing completes, and no additional processing is needed for the identified user interface rule and met trigger event.

At 609, a user interface action is evaluated and applied using specified input values. For example, a user interface action is applied by evaluating the configured operation using the specified input values and applying the operation to a configured target. In some embodiments, the specified input values are reversed (or inverted) input values or specified reverse input values. In various embodiments, the input values can include expressions and/or reference variables such as content data retrieved from customer database fields and/or other data sources. For example, an input value can be an expression that utilizes a conversion factor such as a currency conversion factor that is based on the most up to date currency conversion rate.

In various embodiments, the user interface is modified at 609 by applying the user interface action using the specified input values to the configured target of the action. One or more fields of a user interface view can be modified based on the target configured for the user interface action. For example, the target can be a user interface element label used to display the description of a customer inventory item. Applying an applyStyle operation using a modified background color as an input value modifies the background color of the label in the user interface. As another example, a system_time_ago_format field is configured as the target of the user interface action. Applying a time/date conversion and formatting operation using a date value (e.g., saved using a system time format) as an input value converts the displayed date to a relative date in the user interface. Instead of showing the date as an absolute date (e.g., January 1), the date is shown as a relative time value based on the number of days that have passed (e.g., 4 days ago).

In various embodiments, the configured operation of the user interface action is evaluated by executing a client-side function such as a client-side JavaScript function. For example, the applyStyle operation of the previous example can be executed using a client-side evaluator module. In some embodiments, the operation references a script such as a JavaScript snippet or another similar program block that can be executed or interpreted. In some embodiments, multiple user interface actions are applied for a single user interface rule. In the event there are multiple actions for a single rule, the actions are applied in a deterministic order based on an order parameter associated with the action or another appropriate technique for evaluating the order of operations.

Figure 7:
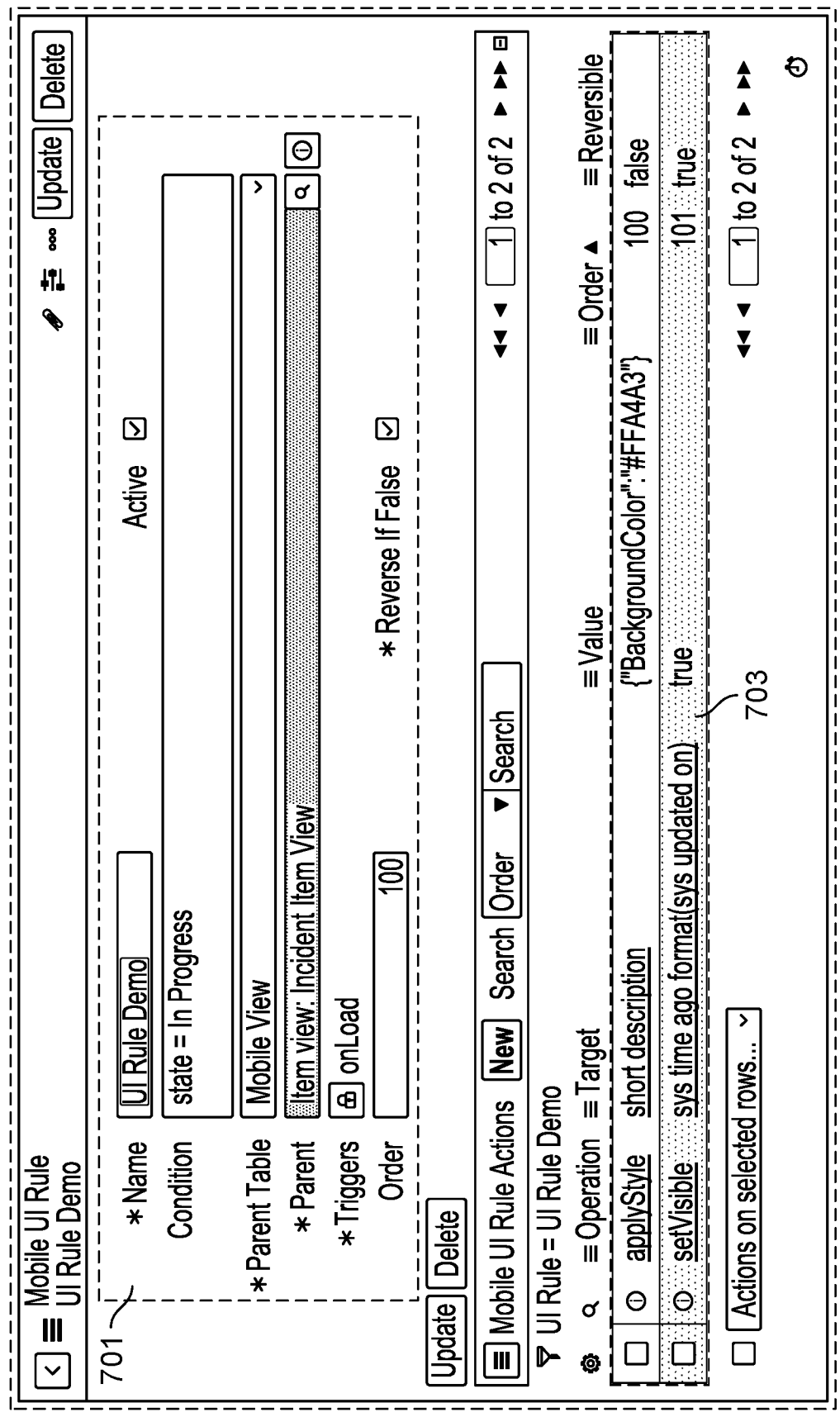
FIG. 7 is a diagram illustrating an embodiment of a user interface for configuring dynamic client-side user interface behaviors.

FIG. 7 is a diagram illustrating an embodiment of a user interface for configuring dynamic client-side user interface behaviors. In the example shown, user interface 700 is displayed via a web form accessed via a cloud service. In some embodiments, user interface 700 is utilized to configure dynamic client-side user interface behaviors for a customized computer application. User interface 700 may be utilized at 201 and/or 211 of FIG. 2, for example, by an administrator, such as a representative of an organization, to configure user interface behaviors for a customized computer application deployed for the organization. In some embodiments, the processes of FIGS. 3 and/or 4 can utilize user interface 700 to receive the configuration specification of a dynamic client-side user interface behavior. In some embodiments, user interface 700 is accessed by a client such as one of clients 101, 103, 105, and 107 of FIG. 1 via a cloud service server such as cloud service server 111 of FIG. 1. In various embodiments, the configuration specification provided via user interface 700 is stored in a database such as database 113 of FIG. 1.

In the example shown, user interface 700 displays details associated with a configuration specification for a dynamic client-side user interface behavior. The configured dynamic client-side user interface behavior includes a user interface rule (names "UI Rule Demo") and two associated user interface actions (with operations applyStyle and setVisible). Details of the configured user interface rule are shown in user interface rule section 701. User interface rule section 701 shows name, condition, parent table, parent, triggers, order, active, and "reverse if false" fields. The name field is used to assign a name to the user interface rule (e.g., "UI Rule Demo"). The condition field is used to assign a trigger condition to the rule (e.g., "state=In Progress"). The associated user interface view to apply the user interface rule is configured by identifying a parent table (e.g., "Mobile View") and a parent ("Item view: Incident Item View"). In some embodiments, the available user interface views and/or elements of the computer application are stored and retrieved from a parent table. The trigger field is used to configure a trigger event (e.g., an "onLoad" event). The order field is used to set an order parameter to specify an evaluation order relative to other rules attached to the same user interface view. In various embodiments, the rules are executed in increasing (or decreasing) order. The active and "reverse if false" fields are flags that can be enabled or disabled. The active field can be used to enable or disable the rule and the "reverse if false" flag is used to reverse an associated user interface action in the event the trigger condition evaluates to a false result. In some embodiments, the "reverse if false" flag is labeled as "reverse action if false." In interface rule section 701, the "reverse if false" flag is enabled which allows the rule to run actions, such as the user interface action with the "setVisible" operation, in reverse.

As shown in user interface 700, the displayed user interface rule is configured with two user interface actions. Details of the configured user interface actions are shown in user interface actions section 703. User interface actions section 703 shows two user interface actions, each with a configured operation, target, value, order, and reversible field. The operation field is used to configure an operation to execute (e.g., "applyStyle" or "setVisible"). The target field specifies a user interface element or field of a user interface view that will be modified (e.g., "short_description" or "sys_time_ago_format(sys_updated_on)"). In some embodiments, the specified target is a reference for a user interface element accessible via a client-side script. The value field specifies an input value for the configured operation (e.g., "{"BackgroundColor":"#FFA4A3"}" or "true"). The configured value for each action is passed to the configured operation when the operation is executed to modify the specified target. The order field is used to set an order parameter to specify an evaluation order relative to other actions attached to the same user interface rule. User interface actions section 703 shows the top rule with an order parameter set to 100 and the bottom rule with an order parameter set to 101. In various embodiments, actions attached to the same rule are executed in increasing (or decreasing) order. The reversible field is a flag that specifies whether the associated action can be and should be reversed. For example, a bottom user interface action with the "setVisible" operation is reversible and the action can be reversed by inverting (or reversing) the input value from a "true" value to a "false" value. The reverse action hides the target whereas the default action makes the target visible. In some embodiments, the value of the reversible field is automatically determined. In various embodiments, whether a reversible action should be reversed is based on the configuration of the user interface rule.

Figure 8:
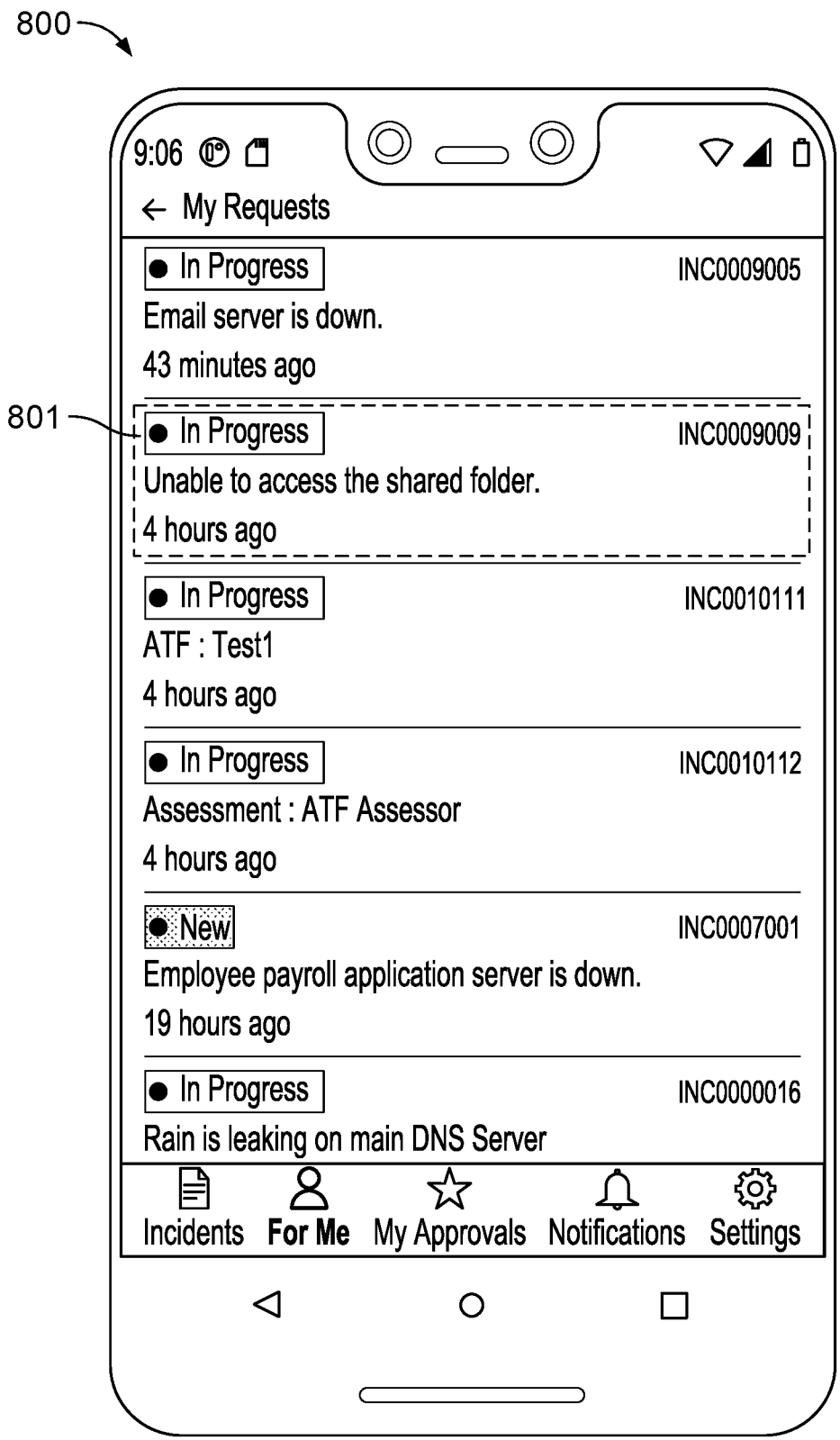
FIG. 8 is a diagram illustrating an embodiment of a user interface of a computer application configured for applying a dynamic client-side user interface behavior.

FIG. 8 is a diagram illustrating an embodiment of a user interface of a computer application configured for applying a dynamic client-side user interface behavior. In various embodiments, user interface 800 is generated by a computer application, such as a mobile application, and is used by a user of the application to view and/or modify customer data. In the example shown, user interface 800 displays a list of item records corresponding to IT Ticket Requests. Item record 801 of the list of item records is labeled to demonstrate the default user interface behavior when no dynamic user interface behaviors are applicable. In some embodiments, user interface 800 shows the state of the user interface of a computer application after the processes of FIGS. 2 and/or 5 have finished applying dynamic client-side user interface behaviors and determined that the user interface should not be modified. In some embodiments, user interface 800 is displayed on a client such as one of clients 101, 103, 105, and 107 of FIG. 1 using content data retrieved from a cloud service server such as cloud service server 111 of FIG. 1.

In the example shown, a list of item records, including item record 801, is displayed in user interface 800. Each item record includes a state (e.g., "In Progress" or "New"), a description, a ticket number, and a time value field. In the example shown, the description field describes the particular IT Ticket request, the ticket number is a unique identifier for the ticket, and the time value is displayed as a relative time based on the amount of time that has passed. The description field is shown for each item record and is rendered without a special background color. Similarly, the ticket number and the time value fields are each rendered without a special background. The state field is rendered with a different background color based on the value of the field. Using item record 801 as an example, the state field has the value "In Progress," the description field has the value "Unable to access the shared folder," the ticket number field has the value "INC0009009," and the time value field has the value "4 hours ago." Although dynamic client-side user interface behavior can be used to render the fields of user interface 800, in the example shown, no dynamic client-side user interface behaviors are enabled. The shown formatting and display parameters are static and default configurations. In contrast, corresponding FIGS. 9 and 10 demonstrate examples of the user interface after one or more dynamic client-side user interface behaviors are applied.

Figure 9:
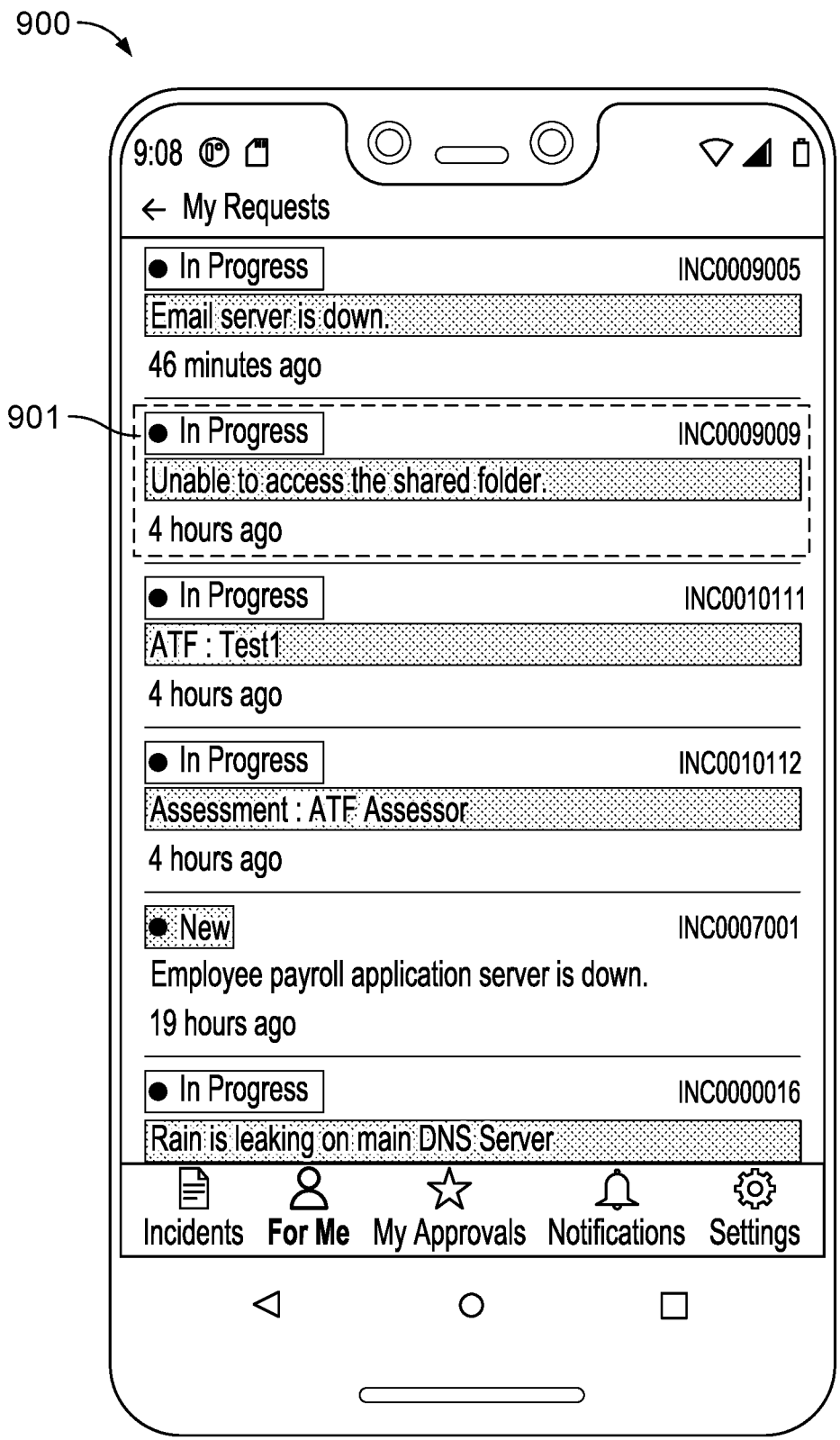
FIG. 9 is a diagram illustrating an embodiment of a user interface of a computer application after applying a dynamic client-side user interface behavior.

FIG. 9 is a diagram illustrating an embodiment of a user interface of a computer application after applying a dynamic client-side user interface behavior. In the example shown, user interface 900 corresponds to user interface 800 after a single dynamic client-side user interface behavior is applied. In various embodiments, user interface 900 corresponds to applying the user interface rule shown in user interface rule section 701 of FIG. 7 but configured with only a single user interface action. The applied user interface action is the first user interface action shown in user interface actions section 703 of FIG. 7 corresponding to the "applyStyle" operation. In some embodiments, user interface 900 shows the state of the user interface of a computer application after the processes of FIGS. 2, 5, and/or 6 have finished retrieving and applying dynamic client-side user interface behaviors to modify the user interface. In some embodiments, user interface 900 is displayed on a client such as one of clients 101, 103, 105, and 107 of FIG. 1 using content data and a dynamic client-side user interface behavior retrieved from a cloud service server such as cloud service server 111 of FIG. 1.

In the example of FIG. 9, user interface 900 has the dynamic client-side user interface behavior applied after a trigger event, in this case the onLoad event, occurs. The trigger condition is evaluated to identify which item records have a state value that is "In Progress" (e.g., evaluating the trigger condition "state=In Progress"). For the item records that meet the trigger condition of the user interface rule, the configured user interface action is applied to execute the operation "applyStyle" with the value "{"BackgroundColor":"#FFA4A3"}" on the target field "short description." As exemplified by item record 901, the dynamic client-side user interface behavior modifies the user interface to highlight the description field of each item record that is "In Progress" by changing the background color. Records that have a different state (e.g., such as "New") are not modified and their descriptions are shown with the default background color. The applied dynamic client-side user interface behavior changes the default user interface behavior shown with user interface 800 of FIG. 8 to user interface 900.

Figure 10:
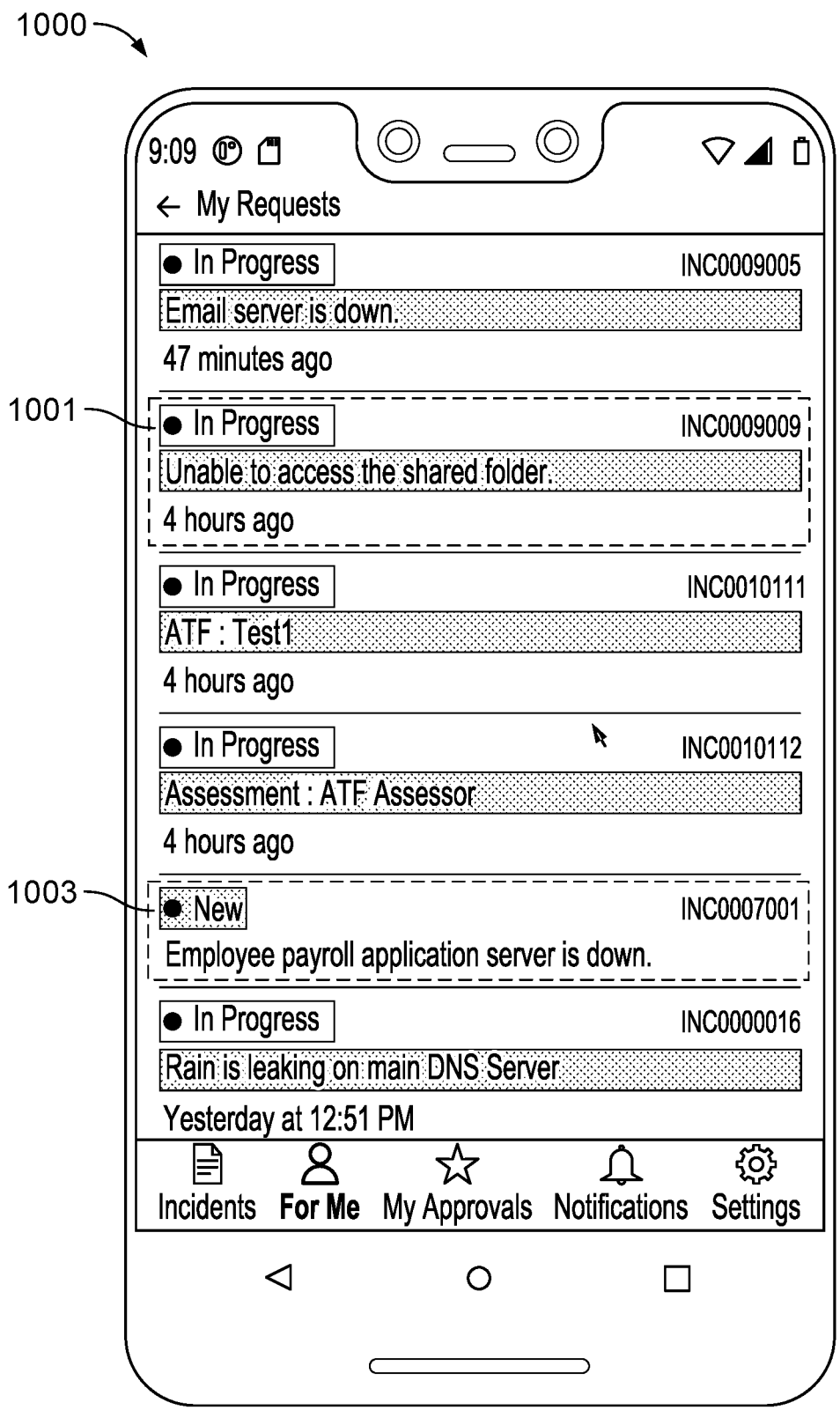
FIG. 10 is a diagram illustrating an embodiment of a user interface of a computer application after applying a dynamic client-side user interface behavior with multiple user interface actions.

FIG. 10 is a diagram illustrating an embodiment of a user interface of a computer application after applying a dynamic client-side user interface behavior with multiple user interface actions. In the example shown, user interface 1000 corresponds to user interface 900 after a second user interface action that is reversible is applied. In various embodiments, user interface 1000 corresponds to applying the dynamic client-side user interface behavior shown configured in FIG. 7, which includes the user interface rule shown in user interface rule section 701 of FIG. 7 configured with the two user interface actions shown in user interface actions section 703 of FIG. 7. The additional user interface action applied when compared to user interface 900 of FIG. 9 is the second user interface action corresponding to the "setVisible" operation. In some embodiments, user interface 1000 shows the state of the user interface of a computer application after the processes of FIGS. 2, 5, and/or 6 have finished retrieving and applying a dynamic client-side user interface behavior to modify the user interface. In some embodiments, user interface 1000 is displayed on a client such as one of clients 101, 103, 105, and 107 of FIG. 1 using content data and a dynamic client-side user interface behavior retrieved from a cloud service server such as cloud service server 111 of FIG. 1.

In the example of FIG. 10, user interface 1000 has the dynamic client-side user interface behavior applied after a trigger event, in this case the onLoad event, occurs. The trigger condition is evaluated to identify which item records have a state value that is "In Progress" (e.g., evaluating the trigger condition "state=In Progress"). For the item records that meet the trigger condition of the user interface rule, both configured user interface actions are applied. The first user interface action corresponding to the operation "applyStyle" is applied first based on its lower order parameter. The user interface rule is applied as described with respect to FIG. 9 to highlight the description field of each item record that is "In Progress" by changing its background color. Once the first action is finished, the second user interface action corresponding to the operation "setVisible" is applied. Since this action is "reversible" and the user interface rule has enabled reversing the action when the trigger condition evaluates to false (e.g., the "reverse if false" flag is enabled), the user interface is modified for every item record displayed. Items records that are "In Progress" have their corresponding sys_time_ago_format(sys_updated_on) field set to visible (using the default configured value "true"). This displays the time field of the records that are "In Progress" as shown with item record 1001 (e.g., the time value is shown as "4 hours ago"). Since the rule enables reversing the actions and the "setVisible" user interface action is reversible, the reverse action is applied to item records that evaluate to a false result based on the trigger condition. In the example shown, the reverse action applies the "setVisible" operation to the sys_time_ago_format(sys_updated_on) field using the inverse (or reverse) of the configured default value (e.g., using the value "false" instead of the default input value "true"). This hides the time field of the records that are not "In Progress" as shown with item record 1003 with state value "New." The time value of item record 1003 is now hidden and no longer shown when compared to user interface 800 of FIG. 8 and user interface 900 of FIG. 9.

Figure 11:
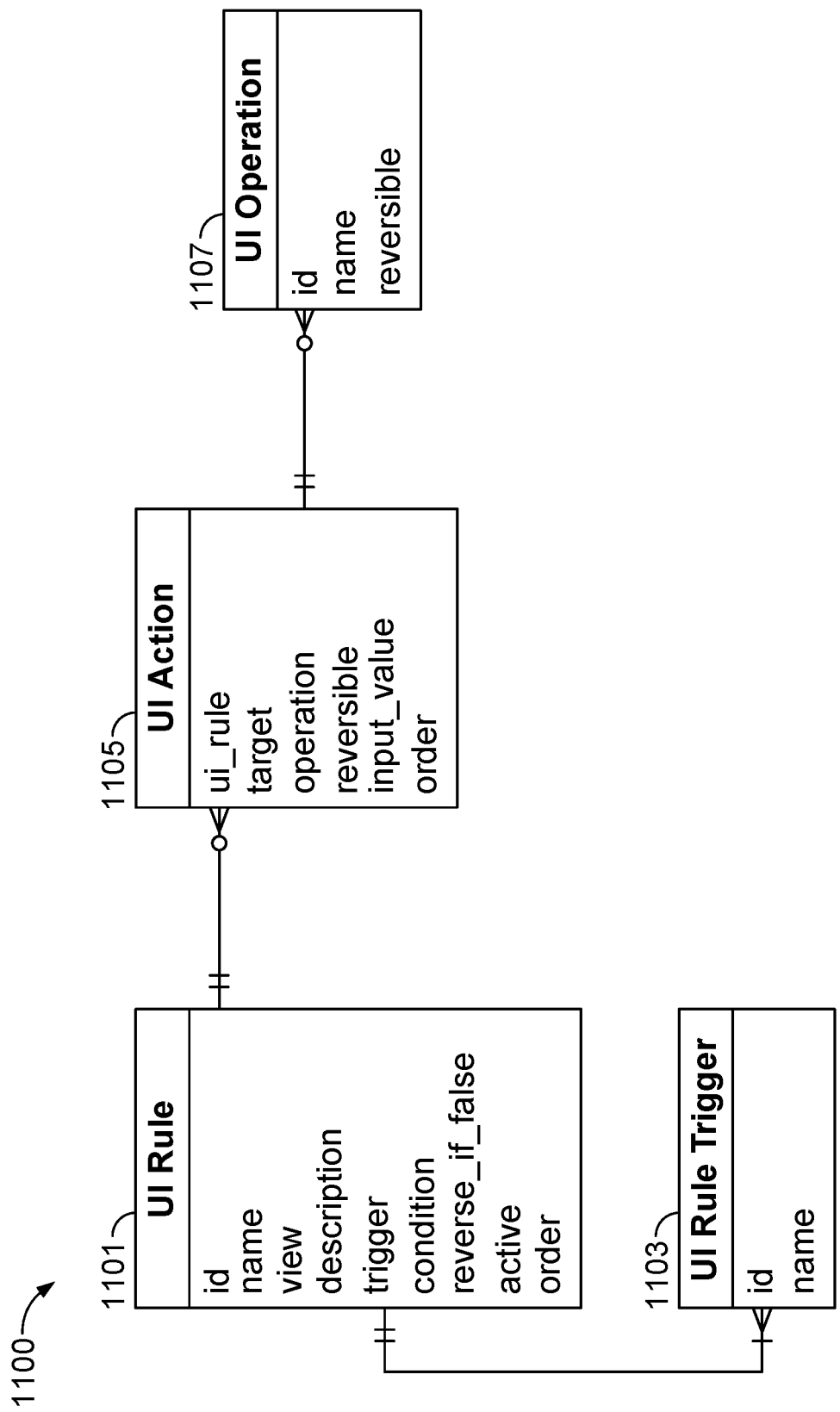
FIG. 11 is a diagram illustrating an embodiment of a database schema for dynamic client-side user interface behaviors.

FIG. 11 is a diagram illustrating an embodiment of a database schema for dynamic client-side user interface behaviors. In various embodiments, schema 1100 of FIG. 11 is used to define and store dynamic client-side user interface behaviors. In various embodiments, the values stored are received using the processes of FIGS. 2 and/or 3. The values can be provided using a form application with a user interface such as user interface 700 of FIG. 7. For example, an administrator configures a dynamic client-side user interface behavior by providing a configuration specification which is stored in a database such as database 113 of FIG. 1 using the tables and relationships described by schema 1100.

In the example shown, schema 1100 includes tables UI Rule 1101, UI Rule Trigger 1103, UI Action 1105, and UI Operation 1107. Table UI Rule 1101 is used to describe a user interface rule and includes columns id, name, view, description, trigger, condition, reverse_if_false, active, and order. In various embodiments, the id field is an identifier for a user interface rule. The name field is used to assign a name to the rule. The view field is used to associate the rule with a user interface view of a computer application. The description field is used to attach a description to the rule. The trigger field is used to specify a trigger event for the rule. The condition field is used to specify a trigger condition for the rule. The reverse_if_false field is used to enable reversing the user interface actions in the event the trigger condition evaluates to a false result. The active field is used to enable or disable the rule. The order field is used to set an order parameter to set a relative evaluation order for the rule. Table UI Rule Trigger 1103 is used to describe a user interface trigger event and includes columns id and name. In various embodiments, the id field is used as a trigger identifier and the name field is used to describe the trigger condition. Table UI Action 1105 is used to describe a user interface action and has columns ui_rule, target, operation, reversible, input value, and order. In various embodiments, the ui_rule field is used to identify a user interface rule, the target field is used to identify a user interface element or field, the operation field is used to identify a client-side operation, the reversible field is used to describe whether the operation should be (or can be) reversed, the input_value field is used to specify an input value to the operation, and the order field is used to set a relative evaluation order for the action. Table UI Operation 1107 is used to describe a client-side user interface operation and has columns id, name, and reversible. In various embodiments, the id field is used as an operation identifier, the name field is used to describe the operation, and the reversible field is used to describe whether the operation should be (or can be) reversed.

As shown in the FIG. 11, schema 1100 describes example relationships between the tables. Each user interface rule of Table UI Rule 1101 is related to one or more triggers from Table UI Rule Trigger 1103 and zero or more user interface actions from Table UI Action 1105. Each user interface action from Table UI Action 1105 is related to zero or more user interface operations from Table UI Operation 1107. Although schema 1100 describes a database schema for storing user interface behaviors as user interface rules, triggers, actions, and operations, an alternative schema with fewer or more tables and/or with different relationships between tables can be appropriate as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving from a representative of an organization a specification of a client-side user interface behavior for a view of a computer application, wherein the specification specifies a relative order of precedence of the client-side user interface behavior among one or more other client-side user interface behaviors and the same client-side user interface behavior is reusable as a selectable option among existing user interface behavior options reusable across one or more other computer applications;
storing the received specification;
receiving via a network a request for content of the view from the computer application associated with a user that belongs to the organization;
identifying the received specification as being associated with the requested content of the view; and
providing via the network the requested content of the view and an identifier of the identified specification of the client-side user interface behavior, wherein the computer application utilizes the received identifier of the identified specification of the client-side user interface behavior to modify the view of the computer application.

2. The method of claim 1, wherein the client-side user interface behavior specifies at least a trigger condition, a trigger event, and one or more executable actions.

3. The method of claim 2, wherein the trigger condition is evaluated to determine a Boolean result.

4. The method of claim 2, wherein the trigger event is a user interface or application event.

5. The method of claim 2, wherein each of the one or more executable actions specifies at least an input value, a target, and an operation.

6. The method of claim 5, wherein the target references a user interface element of the view of the computer application, and wherein the operation has been granted access privileges to modify the target.

7. The method of claim 5, wherein the operation references a client-side function available for execution by the computer application.

8. The method of claim 5, wherein the input value is a Boolean value, and where a result of evaluating the trigger condition is used to reverse the input value.

9. The method of claim 5, wherein the input value is at least a portion of the requested content of the view.

10. The method of claim 9, wherein the input value is a time value, and wherein the operation formats the time value from an absolute time value to a relative time value.

11. The method of claim 9, wherein the operation sets a visibility parameter of a user interface element referenced by the target.

12. The method of claim 9, wherein the operation sets a background color of a user interface element referenced by the target.

13. The method of claim 1, further comprising providing via the network an encoded version of the client-side user interface behavior.

14. The method of claim 13, wherein the encoded version of the client-side user interface behavior specifies at least a trigger condition, a trigger event, and one or more executable actions.

15. A system, comprising:
one or more processors; and
a memory coupled to the one or more processors, wherein the memory is configured to provide the one or more processors with instructions which when executed cause the one or more processors to:
receive from a representative of an organization a specification of a client-side user interface behavior for a view of a computer application, wherein the specification specifies a relative order of precedence of the client-side user interface behavior among one or more other client-side user interface behaviors and the same client-side user interface behavior is reusable as a selectable option among existing user interface behavior options reusable across one or more other computer applications;
store the received specification;
receive via a network a request for content of the view from the computer application associated with a user that belongs to the organization;
identify the received specification as being associated with the requested content of the view; and
provide via the network the requested content of the view and an identifier of the identified specification of the client-side user interface behavior, wherein the computer application utilizes the received identifier of the identified specification of the client-side user interface behavior to modify the view of the computer application.

16. The system of claim 15, wherein the client-side user interface behavior specifies at least a trigger condition, a trigger event, and one or more executable actions.

17. The system of claim 16, wherein each of the one or more executable actions specifies at least an input value, a target, an operation, and an order parameter, wherein the order parameter specifies a relative execution order among the one or more executable actions.

18. The system of claim 17, wherein the input value is at least a portion of the requested content of the view.

19. A method, comprising:
accessing a user interface view of a computer application, wherein the user interface view has a user interface view identifier;
receiving via a network an encoded version of a client-side user interface behavior for the user interface view of the computer application, wherein the client-side user interface behavior is associated with the user interface view identifier, and wherein the client-side user interface behavior specifies at least a trigger condition, a trigger event, and an executable action, wherein a specification specifies a relative order of precedence of the client-side user interface behavior among one or more other client-side user interface behaviors and the same client-side user interface behavior is reusable as a selectable option among existing user interface behavior options reusable across one or more other computer applications;
receiving via the network content data associated with the user interface view; and
applying the client-side user interface behavior to modify a presentation of the received content data in the user interface view.

20. The method of claim 19, further comprising:
receiving via the network an encoded version of an updated client-side user interface behavior; and
applying the updated client-side user interface behavior to modify the presentation of the received content data in the user interface view.

* * * * *